March 20, 1951     L. R. EVANS     2,545,610
ACTUATING MECHANISM FOR COLLETS AND THE LIKE
Filed Oct. 14, 1949
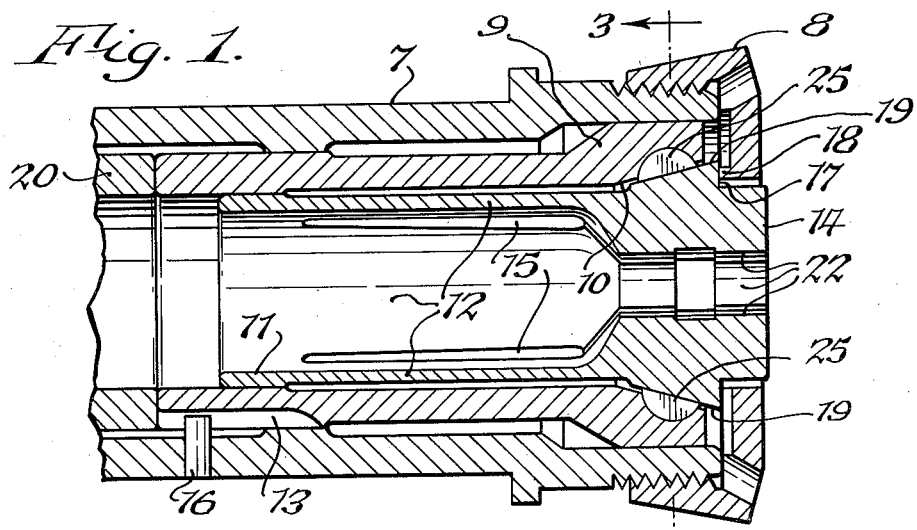
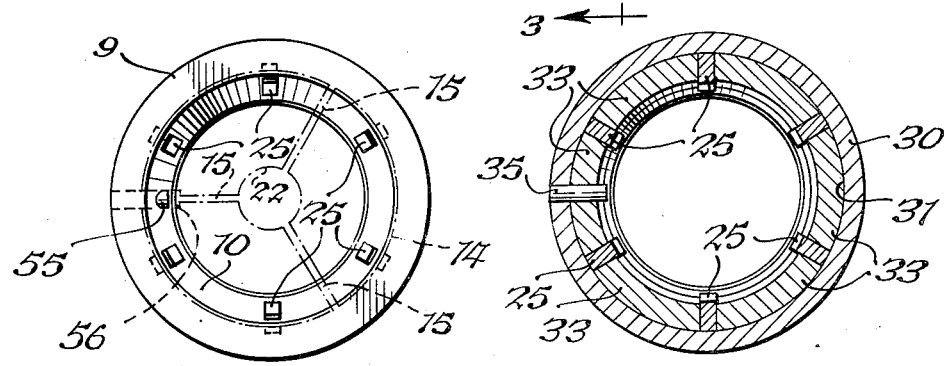
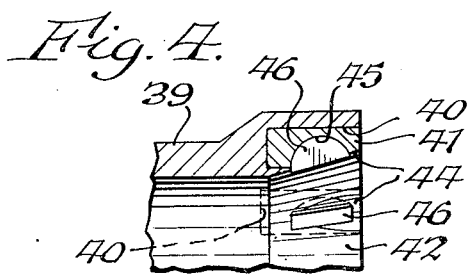
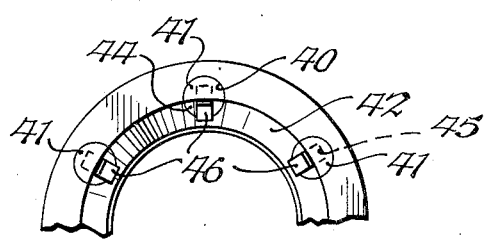
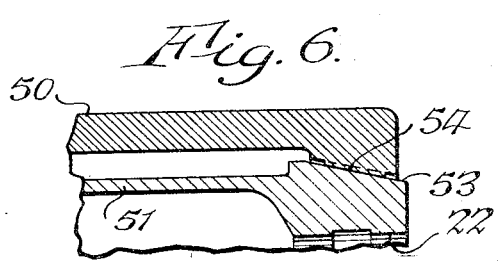
INVENTOR.
Leigh R. Evans
BY Parker, Curchner & Farmer,
Attorney.

Patented Mar. 20, 1951

2,545,610

UNITED STATES PATENT OFFICE 2,545,610

ACTUATING MECHANISM FOR COLLETS AND THE LIKE

Leigh R. Evans, Elmira, N. Y., assignor to Hardinge Brothers, Inc., Elmira, N. Y.

Application October 14, 1949, Serial No. 121,241

14 Claims. (Cl. 279—51)

This invention relates to improvements in mechanism for opening and closing the jaws of collets or chucks of the type commonly used on lathes, automatic screw machines and other machines or implements for gripping the work which is being operated upon.

The collets or chucks used on machines of this type are generally provided with tapering external surfaces on the jaw portions thereof, which cooperate with corresponding internal surfaces on a cooperating member, such as a spindle or other actuator for the collet. These tapering surfaces are generally carefully machined so that when the collet is operating on work of the diameter or size for which it is originally designed, the external tapering surfaces of the collet will seat on an extended area of the internal tapering surface of the lathe spindle, adapter or other collet-actuating member. However, when the workpieces are of slightly different diameters or sizes than those for which the collet is designed, or if the work-gripping jaws of the collet have become worn, then upon closing the collet on the work, the jaws will occupy different positions relatively to the internal tapering surface of the collet-actuating member, and consequently the external tapering surfaces of the collet will not bear along extended areas of the internal tapering surface of the actuating member. When this situation is encountered, greater force must be exerted on the collet to grip the work with the desired force, and this results in greater strains on the collet-closing mechanism of the lathe or other machine. Furthermore, when off-size work is gripped in this manner, there is a tendency of the tapering face of the collet to bind in the corresponding internal tapering surface of the collet actuating member, and this delays the release of the work by the collet. In machines operating at high speeds, this delay in the opening of the collet at times interferes with the correct feeding of work through the collet and results in the formation of short or defective workpieces.

One of the objects of this invention is to provide actuating mechanism of improved construction by means of which the difficulties heretofore encountered are overcome and by means of which less force is required in a direction lengthwise of the collet is required to cause the jaws to close on the work with the required force and to quickly release the work when the force acting lengthwise of the collet is released.

It is also an object of this invention to provide the collet-actuating member, such as the lathe spindle or collet adaptor, with bearing peices arranged at intervals and which bear on the jaws of the collet and are mounted to adjust themselves automatically to conform with the outer, tapering surfaces of the collet jaws.

It is also an object of this invention to provide an improved construction capable of operating in conjunction with collets as heretofore made.

Other objects and advantages will be apparent from the following description of one embodiment of the invention and the novel features will be particularly pointed out hereinafter in connection with the appended claims.

In the accompanying drawings:

Fig. 1 is a longitudinal, central, sectional elevation of a portion of the machine having a collet-actuating mechanism embodying this invention applied thereto.

Fig. 2 is an end view of the mechanism shown in Fig. 1, with the lathe spindle and cap removed therefrom, and with the collet shown in broken lines.

Fig. 3 is a transverse, sectional view of a collet-actuating mechanism of slightly modified construction, the section being taken approximately as indicated by line 3—3, Fig. 1.

Fig. 4 is a fragmentary, longitudinal, sectional elevation of a collet-actuating mechanism of another modified construction.

Fig. 5 is a fragmentary end elevation of the mechanism shown in Fig. 4.

Fig. 6 is a fragmentary, longitudinal, sectional elevation showing another modified form of my improved collet-actuating mechanism applied to a collet of another type.

My improvement may be applied to chucks or collets and machines of many different types and, by way of example, I have shown a portion of a machine on which one type of collet is used, the machine having a lathe spindle 7, the outer end of which is covered with a cap or shroud 8 having a screw-threaded engagement with the spindle. Within the lathe spindle is arranged a collet adapter 9 which is provided at its outer end with a tapering or substantially frusto-conical, internal face 10, thus providing a bell-mouth on the adapter or actuator. The collet which is shown in the construction illustrated includes a substantially cylindrical portion 11, spring fingers 12 formed integral with the cylindrical portion, and jaws 14 formed integral with the ends of the spring fingers, the spring fingers and jaws being separated from each other by means of longitudinal slits 15.

The collet shown in Fig. 1 has three slots 15 and, consequently, three jaws and spring fingers, but collets having any desired number of jaws may be employed in connection with my improved construction. The collet shown has an annular shoulder 17 formed to engage on an annular projection 18 on the cap or shroud 8 for the purpose of preventing the collet from moving outwardly lengthwise with reference to the lathe spindle when the jaws are contracted. The jaws of the collet are also provided on their outer surfaces with the usual tapering or substantially frusto-conical face 19 which, in collets as heretofore constructed, engaged the tapering or bell-mouth 10 of the adapted or collet-actuating member 9. The collet adapter may be moved lengthwise toward the end of the lathe spindle by means of a push tube 20 which engages the inner end of the adapter, and which is actuated by suitable mechanism (not shown) for causing the jaws of the collet to be moved toward the axis of the collet to grip the work which is placed between the work-engaging surfaces 22 of the collet. When the push tube 20 is moved to the left in Fig. 1, the spring fingers 12 of the collet, cooperating with the tapered surface of the bell-mouth of the adapter 9, will cause the adapter to be moved to the left, thus permitting the jaws to move outwardly out of gripping engagement with the work. The adapter may be held against turning relatively to the lathe spindle in any suitable manner, for example, by means of a spline 13 in the adapter into which a pin 16 extends, the pin being secured in a hole formed in the spindle 7.

In order to overcome the difficulties heretofore experienced in the use of collets and chucks in which the external tapering faces of the jaws of the collet engage the internal tapering surfaces of a cooperating member, such as the adapter 9 or a lathe spindle, I provide the bell-mouth portion of the adapter or other cooperating member which effects opening or closing of the collet jaws with suitable bearing pieces thereon formed to extend inwardly beyond the inner, inclined surface of the cooperating member. These bearing pieces are formed to engage the outer tapering or frusto-conical surfaces of the jaws of the collet at parts of the jaws spaced from the longitudinal slots of the collet and serve to keep these surfaces of the collet jaws out of contact with the bell-mouth portion of the collet-actuating member or spindle. These bearing pieces may be of any suitable or desirable construction and may be formed integral with or mounted in the bell-mouth in any suitable or desired manner. It is also very desirable to mount these bearing pieces in such a manner that they can adjust themselves or swing relatively to the bell-mouth portion of the collet-actuating member so that their inner surfaces will at all times lie flatly against the outer, tapering surfaces of the jaws of the collet. In the construction illustrated by way of example, I have provided bearing pieces 25 which are substantially of the shape of "Woodruff" keys. Each of these bearing pieces is preferably in the form of a small plate having parallel flat sides and a face which engages the tapering or inclined external face of a collet jaw, and a partly circular or arcuate face. These bearing pieces, in the construction shown in Figs. 1 and 2, are seated in curved or arcuate recesses formed in the bell-mouth portion of the collet-actuating member, so that, as clearly shown in Fig. 1, when these bearing pieces are seated in the curved recesses they will be free to swing on their curved faces to adapt themselves to the inclined or tapering faces of the collet. The bearing pieces may be made of any suitable material and the edges thereof which engage the collet jaws are curved transversely of their lengths to conform to the curvature of the tapering outer surfaces of the jaws of the collet. Since the bearing strips can adjust themselves relatively to the collet-actuating member 9, they will at all times bear throughout their lengths on the inclined faces of the collet jaws and will be self-alining.

The self-alining bearing pieces may be mounted on the collet-actuating member in any suitable manner, and in the construction shown in Fig. 3, a collet-actuating member 30 is provided which may, for example, be a lathe spindle or an adapter similar to the adapter shown in Fig. 1, and which has an annular groove 31 cut therein, which groove preferably is of partly circular cross section and concentric with the axis of the collet. In order to properly mount the bearing pieces 25 in the groove and to retain them in their correct relations therein, I provide a plurality of spacing members 33 of arc-shaped construction which may be positioned within the groove 31, as clearly shown in Fig. 3, in such a manner that the ends of the spacing members 33 will abut against the sides of the self-alining bearing pieces. In the operation of the construction shown in Fig. 3, the arcuate edges of the bearing pieces 25 will seat on the groove 31 and will be free to swing in the groove, since their arc-shaped rear faces will have the same radius of curvature as a transverse section of the groove 31. The bearing pieces will be held in correct positions with their flat sides parallel with the axis of the collet by the ends of the arc-shaped spacing members, which together with the groove 31 form arcuate recesses similar to the recesses employed in the construction shown in Figs. 1 and 2, in which the self-alining bearing pieces are arranged. Any suitable means may be provided to prevent the assembly of bearing pieces and spacing members 33 from rotating in the groove 31 about the axis of the collet, such for example as a pin 35, extending through apertures in the collet-actuating member 30 and one of the spacing members 33.

In Figs. 4 and 5 I have shown another construction for mounting the self-alining bearing pieces in a collet-actuating member, such as an adapter or a lathe spindle 39. In accordance with this construction, a plurality of holes 40 are formed in the outer end of the collet-actuating member, these holes extending approximately parallel to the axis of the collet-actuating member from the outer end thereof. These holes intersect the tapering or substantially frusto-conical bell-mouth surface 42 of the collet-actuating member. Cylindrical plugs 41 are inserted into these holes. Each of these plugs has a portion of the cylindrical periphery thereof facing the bell-mouth or inner tapering surface 42 cut off at an angle to the axis thereof, thus forming surfaces 44 which will lie substantially flush with the tapering surface 42. An arc-shaped recess 45 is formed in each of these plugs to receive the self-alining bearing pieces 46. The outer or substantially straight edges of the bearing pieces 46 extend slightly beyond the inner, inclined or tapering surface 42. This construction, as illustrated in Figs. 4 and 5, operates in the same manner as that described in connection with the preceding figures.

In the construction shown in Fig. 6, 50 represents a lathe spindle which is formed to cooperate with a "push-out" type of collet 51, the jaws of which are provided with outwardly converging tapering surfaces 52 formed to cooperate with correspondingly tapered inner surfaces on the outer end portion of the lathe spindle 50. The jaws of this type of collet are closed on the work by pushing the collet outwardly with reference to the lathe spindle. It will be understood that this invention may equally well be applied to a "draw-in" type of collet, in which the tapering surfaces of the collet and lathe spindle diverge outwardly instead of converging outwardly, as shown in Fig. 6.

Bearing pieces according to any of the preceding figures may be applied to the lathe spindle 50 to cooperate with the collet. I have found that very satisfactory results can be obtained under certain working conditions if the bearing pieces are rigidly formed on a collet-actuating member, such as an adaptor or lathe spindle if the bearing pieces are rigidly secured thereto. I have consequently shown in Fig. 6 rigid bearing pieces 54 which may be in the form of small strips welded or otherwise rigidly secured to the collet-actuating member, or these bearing strips may be formed in the inner tapering face of the collet-actuating member by cam grinding this surface so as to leave integral bearing strips projecting inwardly from this tapered surface, spaced so as to engage the collet jaws in spaced relation to the edges thereof formed by the slots separating the jaws. This type of bearing piece may, of course, be used in connection with any of the collet-actuating members shown in Figs. 1–5.

In the operation of the mechanism described, in which the self-alining bearing pieces 25 and 46 are provided to contact with the outer tapering surfaces of the jaws of the collet, it will be obvious that as force is applied to the outer, inclined or tapering surfaces of the collet through the medium of the push tube 20 and the collet-actuating members 9, 30 or 39, this force will be transmitted to the collet jaws only through the bearing strips, and since these bearing strips are formed so that they will aline themselves with the tapering surfaces of the collet jaws, and since they project beyond the internal, tapering surface of the collet-actuating member, there can be no tendency of the two tapering surfaces to bind when the collet is operating on off-size work, or when the work-gripping jaws 22 of the collet become worn down. It has been found that by the use of self-alining bearing pieces of this type, the force which must be transmitted to the collet-actuating member through the push tube 20, in order to grip the work in the collet with a predetermined force, is greatly reduced and, furthermore, when the pressure on the push tube is released, the collet jaws instantly move outwardly away from the work to release the same. The construction described therefore is very desirable since, by its use, the collet-closing mechanism of the machine is subjected to much less force than has heretofore been necessary. The construction herein described is particularly desirable for use in connection with high speed machines in which the time interval between the releasing of the jaws and the succeeding closing of the same is materially reduced. During this short interval of time a bar or workpiece must be fed through the collet into the desired final position, and by means of the construction described, due to the instant releasing of the jaws, ample time is provided for the feeding of the work forwardly into the collet. The construction described has the further advantage that the same may be used in connection with collets as heretofore constructed without requiring any change in the collets themselves.

Preferably two bearing pieces are provided for each collet jaw, which act on the jaw in spaced relation to the middle portion and longitudinal edges thereof. The collets are held against rotation relatively to the rotary cooperating member by any suitable or usual means, such for example, as the usual pin 55 extending into an enlargement 56 of one of the slits of the collet, as shown in Fig. 2.

It will be understood that various changes in the details, materials and arrangements of parts which have been herein described and illustrated in order to explain the nature of the invention, may be made by those skilled in the art within the principle and scope of the invention as expressed in the appended claims.

I claim:

1. In a work-gripping construction including a collet member having a plurality of jaws movable toward and from each other, and each having inner work-gripping surfaces and outer tapering surfaces, a cooperating member within which said collet member operates and which has an inner tapering surface extending about said outer tapering surfaces of said jaws, that improvement which includes bearing pieces on said cooperating member which project toward the axis of rotation of said cooperating member beyond the inner tapering surface thereof and having faces for engaging with the outer tapering surfaces of said collet member and which hold said tapering surfaces of said collet member out of engagement with said inner tapering surface of said cooperating member.

2. In a work-gripping construction including a collet member having a plurality of jaws movable toward and from each other, and each having inner work-gripping surfaces and outer tapering surfaces, a cooperating member within which said collet member operates and which has an inner tapering surface extending about said outer tapering surfaces of said jaws, that improvement which includes bearing pieces on said cooperating member which project toward the axis of rotation of said cooperating member beyond the inner tapering surface thereof and having faces for engaging with the outer tapering surfaces of said collet member and which hold said tapering surfaces of said collet member out of engagement with said inner tapering surface of said cooperating member, and means for swingably mounting said bearing pieces on said cooperating member to enable said faces of said bearing pieces to aline themselves with the tapering surfaces of said collet jaws.

3. A work-gripping construction according to claim 2, in which said bearing pieces are in forms of strips arranged in planes extending substantially lengthwise with reference to said collet member and having inner faces engaging the tapering surfaces of said collet member, said cooperating member having arc-shaped recesses into which said bearing pieces extend, said bearing pieces having arc-shaped faces seated in said arc-shaped recesses of said cooperating member to enable said straight faces to aline themselves with the tapering surfaces of said collet member.

4. In a work-gripping construction including a collet member having a plurality of jaws with inner work-gripping surfaces and which are movable toward and from each other into and out of gripping relation to the work, the jaws of said collet member having exterior tapering surfaces, that improvement for moving said jaw members toward each other to grip the work, which includes a member cooperating with said exterior surfaces of said jaws, bearing pieces mounted on said cooperating member and extending inwardly into engagement with said outer tapering surface of said collet member, said bearing pieces being movably mounted on said cooperating member to enable the inner faces of said bearing pieces to aline themselves with the tapering surface of said collet member.

5. A work-gripping construction for cooperation with a collet having a plurality of jaws provided with inner work-gripping surfaces and movable toward and from each other, said jaws having outer tapering surfaces, that improvement which includes a collet cooperating member arranged about said collet and having a portion thereof extending about said tapering surfaces of said jaws, bearing pieces movably mounted on said portion of said cooperating member and projecting inwardly into engagement with the tapering surfaces of said jaws, whereby the bearing pieces may swing relatively to said cooperating member to aline themselves with the tapering surfaces of said jaws during relative lengthwise movement of said cooperating member and said collet to move said jaws toward each other.

6. A work-gripping construction according to claim 5, characterized in that said cooperating member is provided with recesses in the portion thereof extending about said jaws, and cooperating parts in said recesses and on said bearing pieces for enabling said bearing pieces to swing relatively to said cooperating member to aline themselves with said tapering surfaces of said jaws.

7. A work-gripping construction according to claim 5, in which said cooperating member is provided with arc-shaped recesses extending lengthwise thereof, and in which said bearing pieces have arc-shaped edge portions which cooperate with said arc-shaped recesses to enable said bearing pieces to swing relatively to said cooperating member to permit the inner edge portions of said bearing pieces to aline themselves with the tapering surfaces of said jaws.

8. In a work-gripping construction including a collet member having a plurality of jaws with inner work-gripping surfaces and which are movable toward and from each other into and out of gripping relation to the work, the jaws of said collet member having exterior tapering surfaces, that improvement for moving said jaw members toward each other to grip the work which includes a rotary member cooperating with said exterior surfaces of said jaws and having a portion extending about said jaws provided with an annular, inwardly facing groove formed therein concentric with the axis of rotation of said cooperating member, a plurality of spacing members seated in said groove and having their ends spaced from each other, and bearing pieces arranged in said groove between the ends of said spacing members and having outer edge portions extending inwardly beyond said spacing members into engagement with the exterior tapering surfaces of said jaws.

9. A work-gripping construction according to claim 8, in which said bearing pieces have surfaces extending lengthwise of the axis of rotation of said cooperating member and which engage said outer tapering surfaces of said jaws, said bearing pieces being shiftable relatively to said cooperating member in a direction transversely of said groove to enable said lengthwise surfaces to aline themselves with the tapering surfaces of said jaws.

10. A work-gripping construction according to claim 8, characterized in that said groove is of arc-shaped cross section and in which said bearing pieces have arc-shaped edge portions seating in said groove to permit said bearing pieces to swing relatively to said cooperating members to aline the surfaces of said spacing members extending beyond said groove with said tapering surfaces of said jaws.

11. In a work-gripping construction including a collet member having a plurality of jaws with inner work-gripping surfaces which are movable toward and from each other into and out of gripping relation to the work, the jaws of said collet member having exterior tapering surfaces, that improvement for moving said jaw members toward each other to grip the work, which includes a member cooperating with said exterior surfaces of said jaws and having a plurality of aperatures therein extending inwardly from the outer end thereof in a direction substantially parallel to the axis of rotation of said cooperating member, plugs arranged in said recesses and having slots formed thereon facing inwardly toward said collet, and bearing pieces arranged in said recesses and extending inwardly from said plugs into engagement with the outer tapering surfaces of said collet jaws.

12. A work-gripping construction according to claim 11, in which said bearing pieces are mounted to swing in said recesses to enable the same to aline themselves with said exterior tapering surface of said collet member.

13. In a work-gripping construction including a collet member having a plurality of jaws with inner work-gripping surfaces and which are movable toward and from each other into and out of gripping relation to the work, said jaws of said collet member having exterior tapering surfaces, and a member cooperating with said exterior surfaces of said jaws for moving said jaws toward each other into work-gripping positions and having an interior tapering surface extending about the exterior tapering surfaces of said jaws, a plurality of apertures extending inwardly from the outer end of said cooperating member and arranged substantially parallel to the axis of rotation of said cooperating member and intersecting said tapering surfaces, plugs in said apertures and each having a slot formed therein facing said collet member, and bearing pieces mounted in said slots to swing relatively to said plug members to a limited extent and having edge portions extending beyond said plug members into engagement with said tapering jaws of said collet member.

14. A work-gripping construction according to claim 13, in which said slots in said plugs are of arc-shape and in which the bearing members have arc-shaped edges within said recesses to enable said bearing members to swing relatively to said plugs to aline themselves with the outer tapering surfaces of said jaws.

LEIGH R. EVANS.

REFERENCES CITED

The following references are of record in the file of this patent:

UNITED STATES PATENTS

| Number | Name | Date |
|---|---|---|
| 1,808,288 | Chapman | June 2, 1931 |
| 1,854,632 | Skeel | Apr. 19, 1932 |
| 2,270,661 | Montgomery | Jan. 20, 1942 |
| 2,337,400 | Monte | Dec. 21, 1943 |
| 2,337,511 | Henry | Oct. 23, 1945 |
| 2,448,423 | Dodge | Aug. 31, 1948 |
| 2,487,723 | Nordstrom | Nov. 8, 1949 |